(12) United States Patent  (10) Patent No.: US 8,737,953 B2
Sharma et al.  (45) Date of Patent: *May 27, 2014

(54) FAULT-RESILIENT METHOD OF GENERATING COMPLETE CORRELATED IMS CHARGING DATA RECORDS

(75) Inventors: Ranjan Sharma, New Albany, OH (US); Shengqiang Wang, Cary, NC (US); Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 555 days.

This patent is subject to a terminal disclaimer.

(21) Appl. No.: 12/472,879

(22) Filed: May 27, 2009

(65) Prior Publication Data

US 2010/0304710 A1 Dec. 2, 2010

(51) Int. Cl.
*H04M 11/00* (2006.01)
*H04M 15/00* (2006.01)
*G07F 19/00* (2006.01)

(52) U.S. Cl.
USPC .............................. 455/406; 379/126; 705/34

(58) Field of Classification Search
USPC ............. 705/34, 32, 51–53, 64; 455/405, 406
See application file for complete search history.

(56) References Cited

U.S. PATENT DOCUMENTS

| 6,088,328 | A | * | 7/2000 | McKnight | 370/216 |
| 6,108,300 | A | * | 8/2000 | Coile et al. | 370/217 |
| 6,330,312 | B1 | | 12/2001 | Wright et al. | |
| 7,010,104 | B1 | | 3/2006 | Cai et al. | |
| 8,155,290 | B2 | * | 4/2012 | Cai | 379/115.01 |
| 8,315,925 | B1 | * | 11/2012 | Cazanas et al. | 705/30 |
| 8,463,672 | B2 | * | 6/2013 | Sharma et al. | 705/34 |
| 2003/0126435 | A1 | * | 7/2003 | Mizell et al. | 713/168 |
| 2005/0209861 | A1 | * | 9/2005 | Hewes et al. | 705/1 |
| 2006/0258331 | A1 | | 11/2006 | Syrett et al. | |
| 2007/0111706 | A1 | | 5/2007 | Kumar et al. | |
| 2007/0213031 | A1 | | 9/2007 | Ejzak et al. | |

(Continued)

FOREIGN PATENT DOCUMENTS

EP 1804454 7/2007
JP 2008-508754 3/2008

(Continued)

OTHER PUBLICATIONS

International Search Report dated Oct. 28, 2010.

(Continued)

*Primary Examiner* — Kent Chang
*Assistant Examiner* — Nathan Brittingham
(74) *Attorney, Agent, or Firm* — Fay Sharpe LLP (57) ABSTRACT

An IMS charging collection function node for processing incoming accounting requests (ACRs) is provided. The node includes an ACR database that stores ACR messages, an Incomplete database that stores any ACR [Interim] or [Stop] received by the charging collection function node when a corresponding ACR [Start] is not stored in the ACR database, or also ACR[Start] when the remaining accounting requests, consisting of ACR [Interim] or [Stop] are not available with the charging collection function, a disk that stores ACRs; a first transformation engine that aggregates CDRs, a CDR aggregation database that stores aggregated CDRs, a second transformation engine that correlates CDRs, a CDR correlation database that stores correlated CDRs, and a third evaluation engine that cyclically evaluates the Incomplete database, wherein the IMS charging collection function node is communicatively and collaboratively coupled with other IMS charging collection function nodes across the IMS network to eliminate or reduce production of incomplete CDRs.

14 Claims, 4 Drawing Sheets

(56) References Cited

U.S. PATENT DOCUMENTS

| | | | |
|---|---|---|---|
| 2008/0181378 A1 | 7/2008 | Cai et al. | |
| 2008/0273679 A1* | 11/2008 | Russell et al. | 379/114.28 |
| 2008/0299944 A1 | 12/2008 | Cai | |
| 2010/0257077 A1 | 10/2010 | Cai et al. | |
| 2012/0030077 A1* | 2/2012 | Pei et al. | 705/34 |

FOREIGN PATENT DOCUMENTS

| | | |
|---|---|---|
| JP | 2008-118670 | 5/2008 |
| WO | WO-03609747 | 8/2003 |
| WO | WO 03/105457 A1 | 12/2003 |
| WO | WO 03105457 A1 * | 12/2003 |
| WO | WO 2010/117368 | 10/2010 |

OTHER PUBLICATIONS

3GPP TS 32.240 V7.0.0; 3$^{rd}$ Generation Partnership Project; Technical Specification Group Services and System Aspects; Telecommunication management; Charging management; Charging architecture and principles; (Release 7); Sep. 2006; 39 pages.

"Digital cellular telecommunications system (Phase 2+); Universal Mobile Telecommunications System (UMTS); Telecommunication management; Charging management; Charging architecture and principles (3GPP TS 32.240 version 7.2.0 Release 7); ETSI TS 132240" ETS Standards, LIS, Sophia Antipolis Cedex, France, vol. 3-SA5, No. V7.2.0, Mar. 1, 2007, XP014038277 ISSN: 0000-0001.

Kuhne et al; "Charging in the IP Multimedia Subsystem; A Tutorial "IEEE Communication Magazine, IEEE Service Center, Piscataway, US, vol. 45, No. 7, Jul. 1, 2007, pp. 92-99, XP011187092 ISSN: 0163-6804.

Giola, Stefano and Tomasz Radziszewski, Understanding the IMS Charging Architecture, Jul. 25, 2007, http://www.oracle.com/technetwork/articles/entarch/imc-charging-architecture-092946.html.

Siemens, "Correlation of Charging Information of PS Domain and the IMS" 3GPP Draft; S2-013363, 3$^{rd}$ Generation Partnership Project (3GPP), Mobile Competence Centre; 650, Route Des Lucioles; F-06921 Sophia-Antipolis Cedex; France, vol. SA WG5, no. Mexico; 20011203, Dec. 3, 2001, XP050293280.

RFC 3588; Diameter Base Protocol; Calhoun et al.; Sep. 2003; 147 pages.

3GPP TS 32.295 V6.1.0; 3rd Generation Partnership Project; Technical Specification Group Services and System Aspects; Telecommunication management; Charging management; Charging Data Record (CDR) transfer; (Release 6); Jun. 2005; 32 pages.

* cited by examiner

FAULT-RESILIENT METHOD OF GENERATING COMPLETE CORRELATED IMS CHARGING DATA RECORDS

BACKGROUND OF THE INVENTION

This invention relates to a fault-resilient method and apparatus for generating complete correlated IP Multimedia Subsystem (IMS) charging data records upon charging collection function failover.

While the invention is particularly directed to the art of telecommunications, and will be thus described with specific reference thereto, it will be appreciated that the invention may have usefulness in other fields and applications.

By way of background, a type of communication network gaining popularity is an IP Multimedia Subsystem (IMS) network. As set forth in the 3$^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is defined by the 3GPP to provide multimedia services to communication devices over an Internet Protocol (IP) network, as IP networks have become the most cost savings bearer network to transmit video, voice, and data. Service providers are accepting this architecture in next generation network evolution.

In IMS networks, the Charging Collection Function (CCF) acts as a charging system, providing for the offline charging for calls and sessions. This offline charging is based on accounting requests sent by the various Network Elements (NEs), implementing the Charging Trigger Function (CTF). The NEs provide accounting requests to the CCF when a configured charging trigger occurs on the NE. The CCF gets these accounting requests via the Diameter Accounting Request (ACR) messages. The ACR messages are acknowledged by an Accounting Answer (ACA) message, which is sent from the CCF to the NE/CTF. Upon receipt of the ACA message, the NE/CTF removes the ACR message from its queue of message to be delivered to the CCF and proceeds to send the next message in the queue to the CCF.

IETF RFC 3588, Diameter Base Protocol, defines a failover strategy whereby a Diameter Client (in this case, NE/CTF) may time out waiting for the acknowledgment (ACA). When the client establishes that the Accounting Server (CCF) is not responding for any reason, the client can failover to a Diameter peer, which is another CCF node for accounting purposes. This results in accounting requests from one call or session to be split across two (or more) CCFs. The complete set of ACRs for the session is not available on any single CCF. This behavior is explained and supported in the standard specifications; see, for example, 3GPP TS 32.298-810, under section 5.1.3.1.16, Incomplete CDR Indication.

However, as a result of this split, each CCF provides an aggregated and correlated Charging Data Record (CDR) for the same session, covering different parts of the session. This means multiple CDRs show up at the billing system, each coming from a CCF that handled part of the session while it was in-service and handling the session accounting requests from the NEs. Also, in case the failover resulted from a complete failure of a CCF, the records held at the failed CCF (or CCFs) are not available until later. While the CCF outage and the resulting delay in providing the CDR to the billing system can be explained, many of the billing mediation systems are not capable of collapsing two or more CDRs that pertain to the same session into one CDR for use by the billing system. Customers using such mediation systems may refuse to accept the Incomplete CDRs. This causes revenue leakage. Additionally, sending two or more CDRs for the same session, especially if there is delay between sending these CDRs to the billing system, potentially results in subscriber queries to the CSR, since these may be perceived as double (or triple) billing for the same session or call. Finally, this mode of handling CCF failures results in generating extra traffic on the link to the billing mediation system, which is counterproductive, since the billing mediation would end up rejecting the Incomplete CDRs eventually.

Therefore, a need exists to handle the failover in such a way that each session or call produces a complete correlated CDR.

INCORPORATION BY REFERENCE

PCT Application Serial No. PCT/US09/40197, filed Apr. 10, 2009, entitled DISTRIBUTIVE CORRELATION OF CHARGING RECORDS ACROSS NETWORK DOMAINS, by Sharma, et al., the disclosures of which are incorporated herein by reference, is mentioned. PCT Application Serial No. PCT/US09/40197 describes a method of correlating charging records generated for different network domains, such as an IMS domain and a packet bearer domain.

SUMMARY OF THE INVENTION

A method and apparatus for generating completely correlated charging data records upon charging collection function (CCF) failover are provided.

A method of processing Accounting Request (ACR) messages in an IP Multimedia Subsystem (IMS) network is provided. The method includes for any ACR [Interim] or ACR [Stop] for a session received by a first charging collection function node, if a corresponding ACR [Start] is not there with the first charging collection function node, the ACR [Interim] or ACR[Stop] is stored in a first incomplete database associated with the first charging collection function node. If the charging collection function node which hosts the correlation functionality (the "correlation host") for these accounting requests is in-service, the first charging collection function node processes the said accounting requests as follows: if the first charging collection function node is sending aggregated CDRs, then those CDRs are written into the correlation database of the correlation host; and if the first charging collection function node is sending ACRs from the first incomplete database, then those ACRs are written into the incomplete database of the correlation host. For each session in the first and correlation host's incomplete databases, the following applies: the charging collection function node in question is the correlation host for the session, but it is missing accounting Start or Stop (or both) information for the session; and the charging collection function node in question is not the correlation host, but it cannot send these records to the correct correlation host since that host is out of service.

In accordance with another aspect of the present invention, the ACR processing method may further include reviving the out of service charging collection function node and processing the revived charging collection function node's corresponding incomplete database as follows. For ACR messages wherein the revived charging collection function node is not the correlation host, determine the correlation host and write the message to the incomplete database of the host. For pending messages in the incomplete database of the revived charging collection function node, for which the revived charging collection function node is the correlation host, broadcast a "node alive" message to the other nodes in the network indicating that the charging collection function node has been revived.

In accordance with yet another aspect of the present invention, the ACR processing method may further include performing a cyclic evaluation by a resident agent on the first charging collection function node to determine if the correlation host is the charging collection function node. For all messages in the incomplete database on the charging collection function node, where the correlation host is not the charging collection function node, write the ACRs into the incomplete database of the actual in-service correlation host as determined by a distributed correlation approach algorithm. For all messages in the incomplete database on the charging collection function node, where the correlation host is not the charging collection function node, hold on to the ACRs in the incomplete database if the actual correlation host is out-of-service, until the next evaluation cycle arrives. For all messages in the incomplete database on the charging collection function node, compute the time for which the messages have been in the DB and applying appropriate controls, whereby oldest messages are ejected upon exceeding a configurable database watermark and such ejection resulting in an output to a file system marked for unprocessed records. For all messages in the incomplete database on the charging collection function node, compute the time for which the messages have been in the incomplete database and applying appropriate controls, whereby messages that are too old to be of significance are ejected from the incomplete database and such ejection resulting in an output to a file system marked for unprocessed records. For all remaining messages in the incomplete database in the charging collection function node, if it is determined that the charging collection function node is the correlation host, check if all ACR[Start] and ACR [Stop] messages have been made available in the incomplete database, and if so, proceed with the normal processing consisting of aggregation and correlation.

In accordance with yet another aspect of the present invention, in an IP Multimedia Subsystem (IMS) network, an IMS charging system node for processing incoming account requests (ACRs) is provided. The system node includes an ACR database that stores ACR messages; an Incomplete database that stores any ACR [Interim] or [Stop] received by the charging system node when a corresponding ACR [Start] is not stored in the ACR database; a disk that stores ACRs; a first transformation engine that aggregates CDRs; a CDR aggregation database that stores aggregated CDRs; a second transformation engine that correlates CDRs; a CDR correlation database that stores correlated CDRs; and a third transformation engine that generates correlated CDRs, wherein the IMS charging system node is operative to collaborate with other IMS charging systems across the IMS network to reduce production of incomplete CDRs.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Activities utilizing network infrastructure and related services are known as "chargeable events." Chargeable events may include, for example: (a) user to user communication (e.g. a single call, a data communication session or a short message); (b) user to network communication (e.g. service profile administration); (c) inter-network communication (e.g. transferring calls, signaling, or short messages); (d) mobility (e.g. roaming or inter-system handover); and (e) any other activity that the network operator wants to charge for.

"Charging" is a function whereby information related to a chargeable event is formatted and transferred in order to make it possible to determine usage for which the charged party may be billed. The charging function necessarily includes the settlement of invoices among the serving parties (subscriber, network and content provider). The price of network usage must also be settled between the network providers in case of roaming. The real money transaction between the parties (including the user) is usually obliged by contracts. In offline charging, charging information is gathered after the requisition, and so, the subscriber account is debited after the service. Since this information is collected after the event/service, and sent through a network, real-time charging is generally not possible. The online charging mode assures that services are applied only if the subscriber has the necessary amount of money for them.

To provide offline charging for a session in an IMS network, network elements in the IMS network generate Diameter Accounting Request (ACR) messages for the session. Examples of network elements include a serving-Call Session Control Function (S-CSCF), a proxy-CSCF (P-CSCF), an interrogate-CSCF (I-CSCF), a Multimedia Resource Function Controller (MRFC), an application server (AS), a Media Gateway Control Function (MGCF), a Breakout Gateway Control Function (BGCF), etc. When first being involved in the session, the network elements generate ACR[Start] messages. For example, if an S-CSCF receives a SIP INVITE to initiate the session, then the S-CSCF generates an ACR [Start] message. The network elements then transmit the ACR [Start] messages to a Charging Data Function (CDF) that assists in offline charging.

Figure 1:
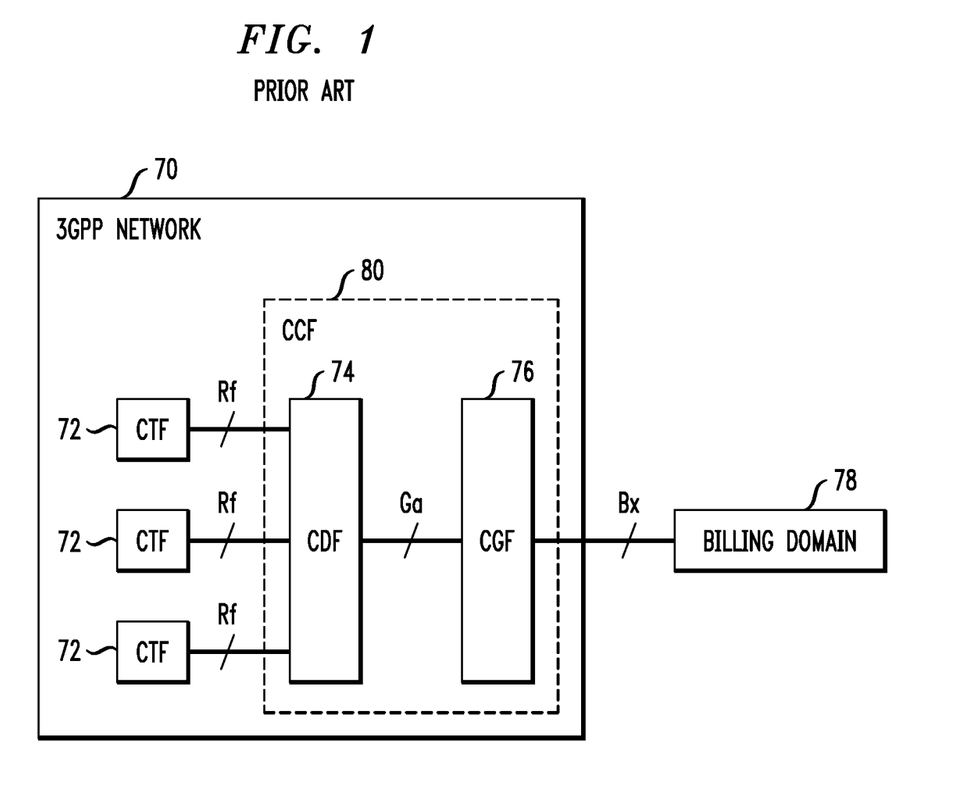
FIG. 1 illustrates an offline charging architecture for a 3GPP network.

Referring now to the drawings wherein the showings are for purposes of illustrating the exemplary embodiments only and not for purposes of limiting the claimed subject matter, FIG. 1 illustrates an offline charging architecture for a 3GPP network 70. In the drawings, like reference numerals have been used throughout to designate identical elements.

Each of the IMS network elements (e.g., P-CSCF, I-CSCF, S-CSCF, BGCF, MRFC, MGCF, AS) includes a Charging Trigger Function (CTF) 72. The offline charging functionality is based on the IMS network elements reporting accounting information upon reception of various SIP methods or ISUP messages, as most of the accounting relevant information is contained in these messages. This reporting is achieved by sending Diameter Accounting Requests (ACR) (Start, Interim, Stop and Event) from each of the IMS network elements to the Charging Data Function (CDF) 74. The Diameter client uses ACR Start, Interim and Stop in procedures related to successful SIP sessions. It uses ACR Events for unsuccessful SIP sessions and for session unrelated procedures. The network elements involved in the session use the DIAMETER Rf interface to send accounting information to the CDF 74 located in the same domain. The CDF 74 will collect all this information and build a Charging Data Record (CDR), which is sent via the Charging Gateway Function (CGF) 76 to the Billing Domain (BD) 78. In practice, the CDF 74 and the CGF 76 may reside in separate physical elements, or they may be integrated within the same physical element. Together, the CDF and CGF are referred to as a Charging Collection Function (CCF) 80. Each session carries an ICID (IMS Charging Identifier) as a unique identifier. Each domain has its own charging network. Billing systems in different domains will also exchange information, so that roaming charges can be applied.

After the session is established, the network elements perodically transmit ACR[Interim] messages to the CDF 74. The network elements transmit the ACR[Interim] messages to the CDF 74 according to a pre-defined interval, such as every five minutes, or upon a change in the service or media. The service or media change can occur at any time in the session, in contrast to the periodic "heartbeat" mechanism driven by a timer set at a pre-defined interval. If the network elements detect that the session ends, such as by receiving a SIP BYE message, then the network elements generate ACR[Stop] messages. The network elements then transmit the ACR[Stop] messages to the CDF 74.

When the CDF 74 first receives the ACR[Start] message from a network element, the CDF 74 opens a Charging Data Record (CDR) for the session for that network element. The CDF 74 then updates the open CDR each time it receives an ACR[Interim] message from the network element base on the charging information in the ACR[Interim]. This update may entail refreshing internal timers and generation of "partial CDRs" that capture partial session information. When the session ends, the CDF 74 receives an ACR[Stop] message from each network element sending accounting requests, and then the CDF 74 closes the CDR for the session for that network element.

There may be instances where the CDF 74 generates an incomplete CDR for a network element. When the CDF 74 first receives the ACR[Start] message from a network element, the CDF 74 starts a timer and communicates the value of the timer via an attribute value pair (AVP), called Accounting-interim-Interval AVP, to the NE/CTF. Based on the value set in the AVP, the NE/CTF is required to periodically send an accounting interim message as a heartbeat for the session. After starting the timer, if the CDF 74 receives an ACR[Stop] message from the network element before expiration of the timer, then the CDF 74 closes the CDR for the session to generate a full CDR. However, in the rainy day scenario, it is possible that the CDF 74 does not get an ACR[Interim] message or an ACR[Stop] message from the network element before expiration of the timer. In this case, the CDF 74 closes the CDR to generate an "Incomplete CDR" for the session.

In either case, whether the CDF generates complete or incomplete CDRs, at some point at the end of the session, the CDRs for the session are aggregated and correlated to be presented to a billing system. In this regard, we turn now to FIG. 2, which provides an overview of the processing stages of incoming ACR messages until they are converted into correlated CDRs for the billing mediation system. The processing is done on one CCF node.

Figure 2:
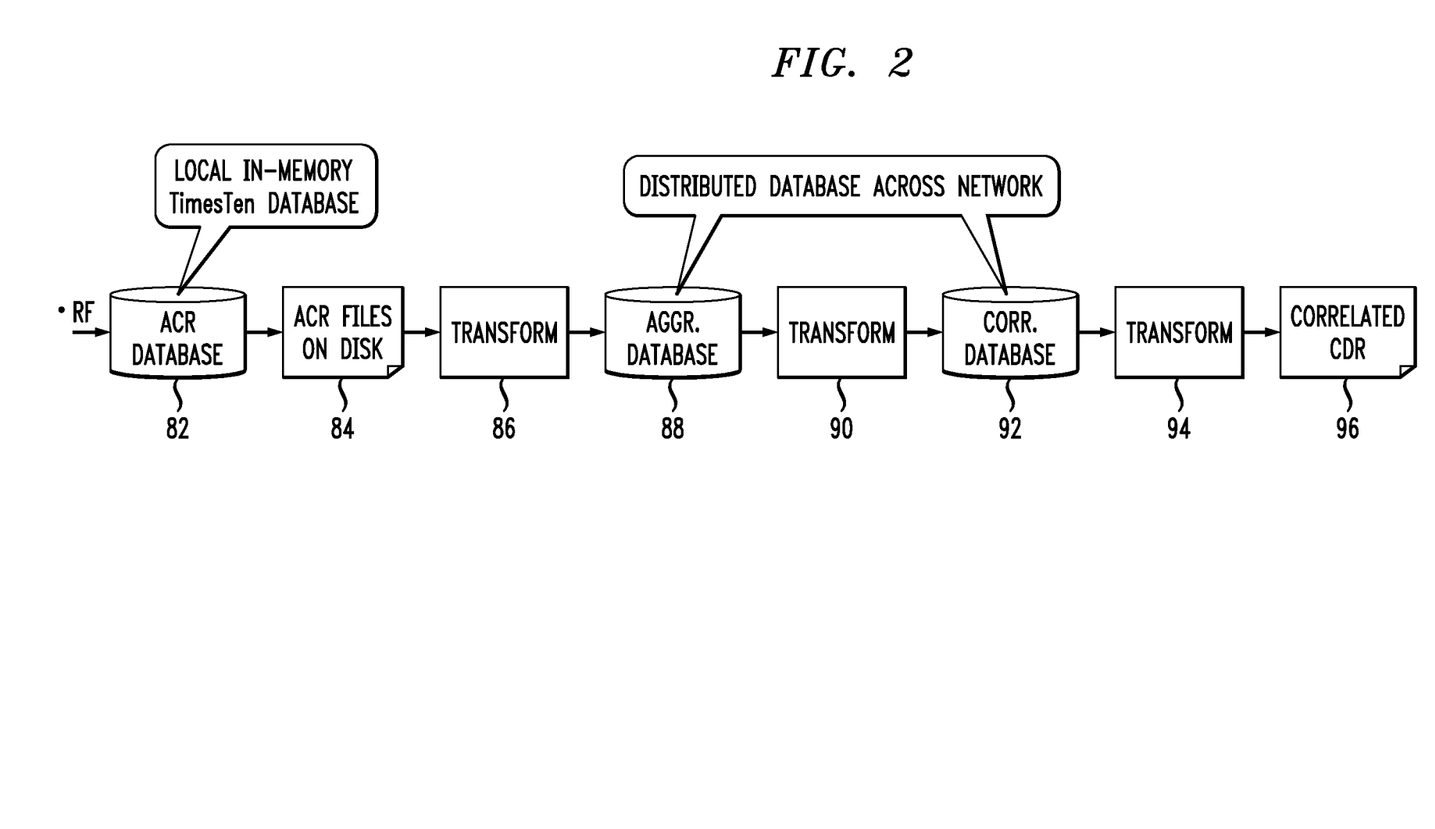
FIG. 2 is a schematic diagram of the CDR generation process.

FIG. 2 shows a general processing sequence of incoming ACRs. The ACRs are stored in an in-memory database (DB) for efficiency reasons (82), before these are written onto files on the disk (84) after ensuring that the ACRs are correctly formatted with all mandatory parameters present. When an ACR[Interim] message is received, the CDF 74 generates a partial CDR, which is stored in the aggregation DB (88) after getting transformed for aggregation in the transformation processing step (86). When the session ends, the end-of-session indicator is provided by the receipt of an ACR[Stop] message from the S-CSCF, for example, the CDF 74 aggregates (86) the CDRs for each network element (if any) in the aggregation database 88. As used herein, "aggregation" refers to the operation performed to identify the partial CDRs for a network element for a session, and combine these partial CDRs together. The CDF 74 then transmits the aggregated CDRs for all of the network elements to a correlation host for the purposes of correlation. As used herein, "correlation" refers to the operation performed to identify the full and incomplete CDRs for each network element that served the session, and to combine the CDRs to generate a single consolidated CDR for the session.

The correlation host identifies the CDRs that have emanated for a given session, tied via the IMS Charging Identifier (ICID), and generates (90) a consolidated CDR for the session. The consolidated CDR thus includes the charging information for each of the network elements that has served the session in the IMS network. The consolidated CDR is transmitted to the CGF 76, which provides persistent storage for the consolidated CDR and then transmits the consolidated CDR to the billing domain 78, which provides billing for the session. The billing domain 78 thus receives a single consolidated CDR from the CGF 76.

The IMS network is considered a signaling domain for a session, since the IMS network is the core network for setting up and maintaining the session. A bearer domain may also be involved in the session. For example, for an IMS voice call, the access network for the voice call may be a General Packet Radio Service (GPRS) network, a Universal Mobile Telecommunications System (UMTS) network, etc. The signaling portion of the call is handled over the IMS network, and the bearer portion may be set up as a Real Time Protocol (RTP) session over the GPRS network. The IMS network may be able to charge for a typical RTP session that is time-based, but there are other instances where it is desirable to acquire charging information from the bearer network as well as the signaling network. For example, during the voice call, a party to the call may download a video over GPRS network. It may be desirable to charge for the data flow of the video download in addition to the time of the session. Thus, there may be multiple domains providing accounting messages to the CDF, not just the IMS domain, which results in charging records from different network domains.

During a typical correlation operation, the CCF 80 correlates the CDRs based on the ICID for the session. Typically, the CCF 80 includes a commercially available server running a commercially available database to perform aggregation and correlation Standard specifications allow closure of a CDR with appropriate annotation as the reason for record closure when accounting requests for the same session get split between two or more CCFS. An accounting session starts with an ACR[Start] and finishes with ACR[Stop]. Between these, there may be one or more ACR[Interim] messages, which are generated upon expiration of a timer negotiated between the CCF and the CTF, or by a change of media or service that makes it necessary for the CCF to account for such changes for billing purposes. In the case of a failover, it is likely that the ACR[Start] and ACR[Stop] end up at different CCFs. The CCF that gets an ACR[Start] but no corresponding ACR [Stop] or a timely ACR[Interim], for example, closes the CDR with the reason for closure marked as 'missing ACR [Stop]'. Likewise, the CCF that gets an ACR[Stop] but does not have a corresponding ACR[Start], closes the CDR with the reason for closure marked as 'missing ACR[Start]'. A third instance can be a CCF that receives an ACR[Interim] for a session, but receives neither ACR[Start] nor ACR[Stop], in this case both ACR[Start] and ACR[Stop] would be marked as lost. This is the standard-specified behavior. In fact, the Incomplete CDR indication can contain the following indications:

```
Incomplete-CDR-Indication ::= SET
{
    aCRStartLost    [0] BOOLEAN, -- TRUE if
    ACR[Start] was lost, FALSE otherwise
    aCRInterimLost  [1] ACRInterimLost,
    aCRStopLost     [2] BOOLEAN -- TRUE if
    ACR[Stop] was lost, FALSE otherwise
}
```

The shortcomings of this approach include, for example, generation of more than one CDR for the session, rejection of the generated CDR marked "Incomplete" by the billing mediation system, consequent leakage of revenue, an increase in processing on individual CCF nodes for the same call/session, and an increase in traffic between the CCFs and the billing mediation system.

The situation for a single failure can be explained with the following textual line diagrams:

A: CTF→ACR[Start]→CCF1
CTF←ACA←CCF1
B: CTF→ACR[Interim]→CCF1
ACA Timed out/no response . . . CCF1 failed!
C: CTF→ACR[Interim]→CCF2
CTF←ACA←CCF2
D: CTF→ACR[Stop]→CCF2
CTF←ACA←CCF2

At point A above, an NE/CTF sets up a Diameter dialog with the CCF, identified as CCF1, by sending an accounting start for a session, with ICID1. The ACA response conveys the AII AVP, which determines the heartbeat frequency for the CTF to report back via ACR[Interim] messages.

At point B above, the CTF reverts to the CCF1 with the heartbeat message. However, at this time, the CCF1 is out of service and does not respond to the message. The CTF can retry sending the ACR[Interim] for a configurable number of times to CCF1, but it would finally give up.

At point C above, the CTF fails over to another CCF, identified as CCF2 and sends the accounting message, ACR [Interim], carrying the ICID1, to it. CCF2 responds with an acknowledgment (ACA). Note that for the same session (signified by ICID1), the accounting requests have now been split across 2 CCFs, CCF1 and CCF2, of which, CCF1 happens to be out of service now.

At point D above, the CTF indicates an end of session via sending an ACR[Stop], carrying the ICID1, and gets acknowledgment from CCF2.

The results are thus an incomplete CDR at CCF1 when it gets back online (not acceptable) and an incomplete CDR at CCF2 (not acceptable).

Similarly, a double failure can be explained as set forth below:

A: CTF→ACR[Start]→CCF1
CTF←ACA←CCF1
B: CTF→ACR[Interim]→CCF1
ACA Timed out/no response . . . CCF1 failed!
C: CTF→ACR[Interim]→CCF2
CTF←ACA←CCF2
D: CTF→ACR[Interim]→CCF2
ACA Timed out/no response . . . CCF2 failed!
E: CTF→ACR[Interim]→CCF3
CTF←ACA←CCF3
F: CTF→ACR[Stop]→CCF3
CTF←ACA←CCF3

Steps A, B and C directly above are identical to those found in the previous example. Step D shows that the failed-over to CCF (CCF2) also fails, resulting in the CTF doing a second fail-over, in step E, to a third CCF (CCF3). Step F shows the session completion indication.

The results in this second case are an incomplete CDR at CCF1 and CCF2 when they get back online (not acceptable) and an incomplete CDR at CCF3 (not acceptable).

Typical CDR generation process can be formulated as a finite state machine, where a CDR is <<opened>> or <<initiated>> upon receipt of an accounting request start, or ACR [Start], the CDR is updated each time an ACR [Interim] is received and for session-related CDRs, the CDR is completed upon receipt of an accounting stop request, ACR [STOP]. The CCF processes the incoming ACRs, storing them in an in-memory database and subsequently in a disk-based DB.

Figure 3:
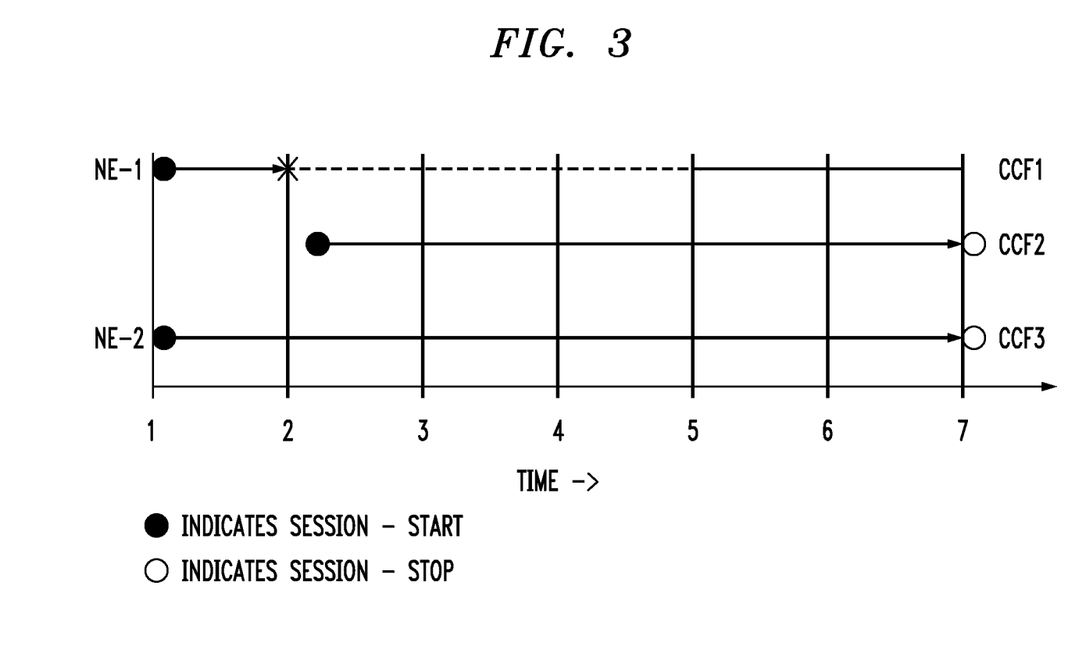
FIG. 3 illustrates a time sequence of CCF failover.

Let us now examine the time sequence of a failover via the diagram shown in FIG. 3, which depicts a pair of NEs (NE-1, NE-2) sending ACR messages to different CCFs (CCF1, CCF2, CCF3). The sequence is described below:

1. Upon a session start at T=1, CCF1 and CCF3 start receiving the ACRs from NE-1 and NE-2 respectively
2. CCF1 fails at T=2. NE-1 gets no ACA for its ACR for 2-3 successive attempts. NE-1 executes a failover to CCF2. CCF2 gets the first ACR at, say, 2:20 with a timestamp of 2:05.
3. At T=5, CCF1 recovers.
4. At T=7, the session ends.

With respect to the FIG. 3, it can be seen that NE-1 fails over to CCF2 sometime after T=2. This would typically produce more than one aggregated CDR for the NE-1, each from CCF1 (when it recovers) and CCF2. There would be a third aggregated CDR, produced by CCF3, based on the accounting requests received from NE-2. Finally, the correlated CDR would selectively collapse the aggregated CDRs into a CDR that represents the complete session. This correlated CDR would be used for billing.

Notice that CCF1 recovers at T=5, which is earlier than the session stop, at T=7. This may or may not be true in all cases. Also note that without the present invention, the resulting correlated CDR would most likely not take the session accounting at CCF1 into consideration and result in one incomplete correlated CDR (between CCF2 and CCF3) and an incomplete CDR (possibly aggregated) from CCF1.

Thus, the present invention enhances the basic work flow for processing ACRs into CDRs by introducing a network-wide view for the correlation processing, where CCFs can collaborate with each other to reduce, if not eliminate, production of "Incomplete CDRs."

This network-wide collaboration is achieved in part by incorporating a new "Incomplete ACR" database in the network, which holds the accounting requests that represent part of the session with a missing Start or Stop. Considering two nodes, the diagram in FIG. 4 provides an overview of an exemplary embodiment of the invention.

Figure 4:
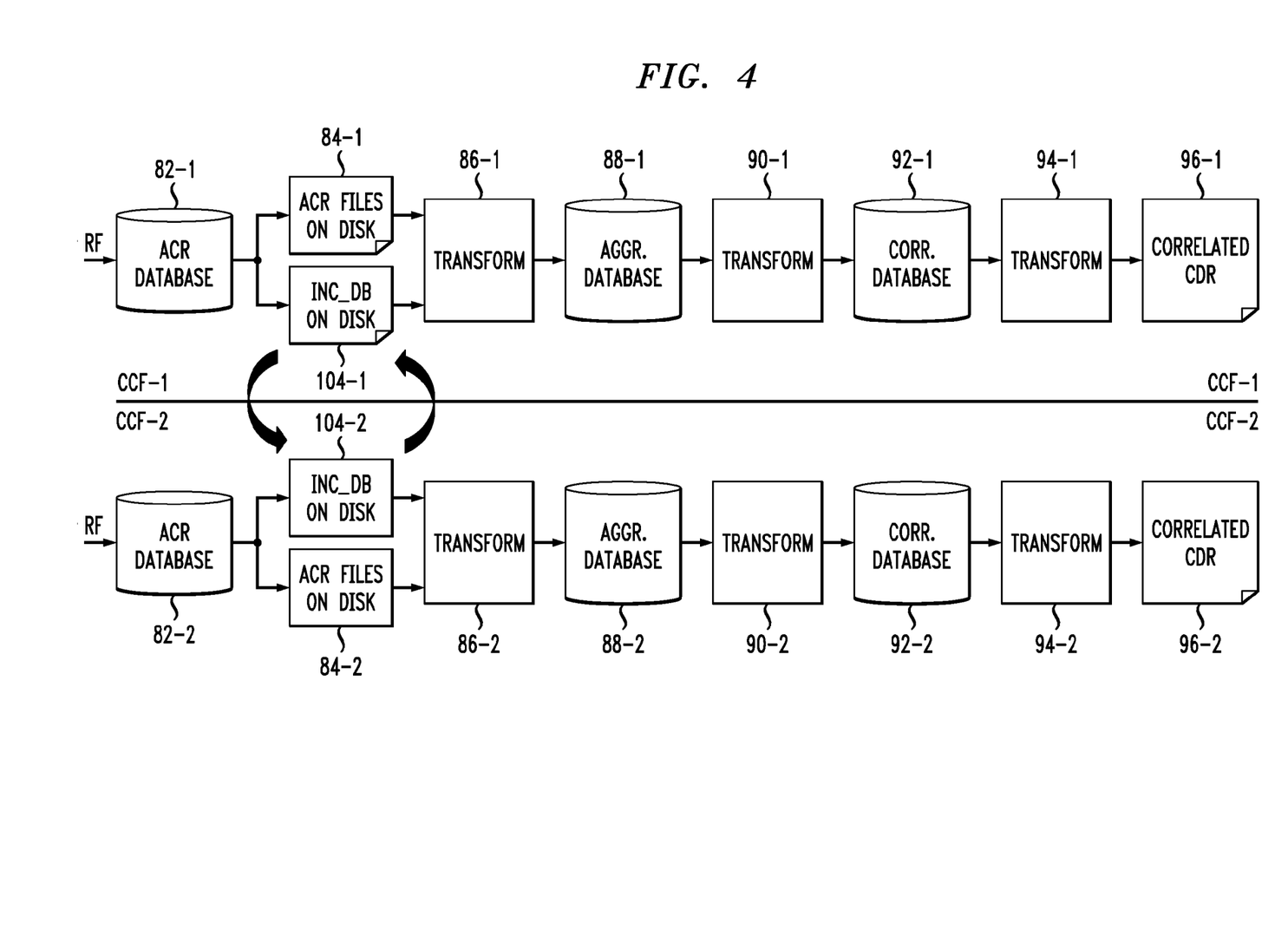
FIG. 4 is a schematic diagram of an improved CDR generation process according to aspects of the present invention.

The horizontal line 102 in FIG. 4 represents the separation between two servers, CCF-1 and CCF-2, which are suitably implemented on two different physically separate servers. Assuming the distributed processing approach for executing correlation, the ICID may be selected as the key to delineate the processing of accounting requests. In short, the received ACR messages on a server may be meant for correlation processing on a different server or on the same server.

For any ACR [Interim] or [Stop] received by a CCF node, if the corresponding ACR [Start] is not there with the node, the ACR would be put in a new database, namely, an Inc_DB 104-n (for incomplete ACR database). For all other ACR messages pertaining to ongoing sessions, the in-memory ACR DB 82-1 and subsequently the disk-based ACR DB 84-1 would be employed. For such <<normal>> accounting messages, the process of aggregation and correlation remains generally unchanged.

DISTRIBUTIVE CORRELATION OF CHARGING RECORDS ACROSS NETWORK DOMAINS, referenced above, provides for a session distribution among correlation hosts, based on the ICID value. In summarizing, this distributed architecture lets each CCF server receive and process ACR messages until an aggregated CDR is produced. Upon reaching this point in execution, the server can use an algorithm to determine the correlation host for the CDR. In its simplest embodiment, if there are N CCF servers in the network, (ICID MOD N) can determine the correlation host. The result from the algorithm could point to the same server or a different server for correlation host functionality.

For the messages accumulated on each server CCF-n in the Inc_DB-n, there would be a cyclic evaluation by an agent on the server to determine if the correlation host is CCF-n or not. For all messages in Inc_DB-n on CCF-n, where the correlation host is not CCF-n, the messages would be written into the Inc_DB-m of the corresponding correlation host, CCF-m, as determined by the distributed correlation approach algorithm. If the correlation host, CCF-m, happens to be out of service, the records remain in CCF-n for a configurable period of time. Subsequent evaluation would try to move these records to the right correlation host upon availability.

For all remaining messages in the Inc_DB-n in the server CCF-n, if it is determined that CCF-n is the correlation host, the evaluation cycle would also check if all accounting Start and Stop messages have been made available in the Inc_DB-n, as would be the case for cyclic movement of the records into the correct correlation DB owner/host. Sessions which have both accounting Start and Stop messages identified, for which the CCF-n is the correlation host, would proceed for correlation functionality execution. Such records would be finalized and sent to the normal processing via the transformation engine performing aggregation (if necessary) and subsequent correlation.

The embodiment below is based on the <<Inc_DB>> enhancement outlined earlier and uses the distributed correlation approach. In this embodiment, incomplete records are held for a maximum (configurable) time in the appropriate Inc_DB. Assuming the failed CCF nodes can be revived within that time, the aggregation and correlation of the records can be provided in terms of completed records to the billing system.

This embodiment modifies the processing of ACRs as explained below:
1. For any ACR [Interim] or [Stop] received by a CCF node, if the corresponding ACR [Start] is not there with the node, the ACR would be put in a new database, that is, Inc_DB (for incomplete database).
2. This Inc_DB would not be touched by aggregation and correlation processes on this CCF node.
3. Based on the subscriber segmentation/distributed database scheme, there can be one owner for the correlation of these records, which is based on f(ICID).
4. If the host for these records is in-service, the records are written into the correct host as follows:
    4a. If the sending CCF is sending aggregated CDRs, then those CDRs would be written into the correct host's correlation DB.
    4b. If the sending CCF is sending records from Inc_DB, these would be written into the correlation host's Inc_DB.
5. At this time, we can assume that each CCF would have several ACR messages in the Inc_DB, which cannot be processed to generate a complete CDR, since either Start or Stop for the session is missing.
6. For each record/session in the Inc_DB in each CCF node, the following applies:
    6a. The CCF node in question is the correlation host for the session, but it is missing the session start or stop (or both) information.
    6b. The CCF node in question is not the correlation host, but it cannot send these records to the correct correlation host since that host is out of service (OOS).

This is a steady-state condition. In other words, the "incomplete DB" holds records which cannot be finalized on the "incomplete DB" host because either they do not capture the entire session or do not have this host as the correlation host.

A second enhancement is provided here when the OOS CCF recovers. This enhancement is to let the waiting nodes know that the CCF is back into service by sending out an "I am alive" message/heartbeat from the recovered CCF to other CCFs.

Note that in the steady-state, there are several CCFs with records in the Inc_DB. Each CCF is waiting either to send or to receive ACRs that would result in completed CDRs:
    (a) If the CCF in question is the correlation host, it is waiting for the remaining ACRs to be sent to Inc_DB by the CCF that has these records.
    —or—
    (b) If the CCF is not the correlation host, it is waiting for the correlation host to be back in service, so that these records can be sent to the correct CCF for aggregation/correlation purposes.

In either case, an associated Audit process with the Inc_DB works with a configurable timer and/or Inc_DB fill factor such that records in the Inc_DB would be deleted after "N" hours of being in the Inc_DB, or until the Inc_DB is P % full (another configurable parameter, say 80%), whichever occurs later. This means that the records in the Inc DB can wait for ~N hours for the recovery of the lost CCFs. By suitably tweaking this parameter, and considering the MTTR for CCF servers, a network operator can virtually eliminate the issues related to "Incomplete CDRs" when using this solution.

When the OOS CCF is revived, it would first process its own Inc_DB and then do the following:
1. For messages in the Inc_DB that are older than N hours, it is likely that these ACRs are stale and would result in incomplete CDRs in any case. Sending such ACRs to other nodes, or waiting for the complementary session information from other nodes would be futile. Such ACRs can be output to a "Lost" DB. Note that by putting a large value of "N" to handle the worst case CCF recovery time, there would be no lost records or the need for a 'Lost' DB.

2. For the remaining messages in the Inc_DB, there would be a mix of messages where the revived CCF is the correlation host, and where the revived CCF is only holding these messages for some other node.
3. For messages in which the revived CCF is not the correlation host, it would determine the correlation host and write the message to the Inc_DB of the correctly identified CCF, as f(ICID).
4. If there are still pending messages in the Inc_DB, it can be assumed that the revived CCF is the correlation host for such messages. Since the ACRs for the corresponding session could be with any of the remaining CCFs in the network, this CCF would broadcast an "I am alive" message to the other nodes in the network.
5. The message would prompt the other CCFs to send the records they are holding in the Inc_DB for this CCF.
6. The "I am alive" message can be sent 3-4 times after the CCF recovery, to compensate for any node missing to read the message (unlikely).

Note that in a steady-state, the "I am alive" message broadcast is not required. CCF nodes can determine if other CCF is OOS, upon attempting to write into their DB (Inc_DB or Correlation DB).

Note also that CCFs do not actively and aggressively ask other CCFs "Who has the records for ICID=xyz?." This would create a lot of network traffic and processing load. Instead, each CCF dutifully forwards the ACRs (or CDRs) that belong to a specific correlation host. The delayed processing of correlation because of server failover results in the transmission of the record in non real-time to the billing system. The invention here includes the use of a new value for the "Cause for Record Closing" (3GPP TS 32.298 810, Section 5.1.3.1.8) as "Delayed closure for avoiding Incomplete CDR."

Thus, the present invention would, for instance, aid in the prevention of potential revenue leakage since billing systems can reject incomplete CDRs, optimize processing by deferring it to a later stage when all records are available, instead of processing whatever is available now and then running the risk of rejection (double loss—first, in terms of CPU processing cycles and second, rejection anyway by the billing system), and optimize on the transport of billing records to the billing mediation—avoids sending two or more incomplete CDRs for the same session The network elements described herein may reside in one or more processor-based devices. These devices execute programs to implement the functionality described herein and generally associated with 3GPP/3GPP2 wireless systems. The flexibility of these processor-based systems permits ready integration into these systems of a method of generating completely correlated CDRs upon CCF-failover in accordance with aspects of the present invention. It should be noted, however, that as utilized herein, the term "processor" is not intended to refer exclusively to hardware capable of executing software.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing Accounting Request (ACR) messages in an IP Multimedia Subsystem (IMS) network, the method comprising:

for an ACR [Interim] or ACR[Stop] message for a session received by a charging collection function node, if a corresponding ACR [Start] message is not stored at the charging collection function node, the ACR [Interim] or ACR[Stop] message is stored in an incomplete database associated with the charging collection function node;

if the charging collection function node that hosts the correlation functionality (the "correlation host") for the ACRs is in-service, the charging collection function node processes the ACRs as follows:
  if the charging collection function node is sending aggregated charging data records (CDRs), then the CDRs are written into a correlation database of the correlation host;
  if the charging collection function node is sending ACRs from the incomplete database, then the ACRs are written into the incomplete database of the correlation host;

reviving an out of service charging collection function node;

processing the revived charging collection function node's corresponding incomplete database as follows:
  for ACR messages wherein the revived charging collection function node is not the correlation host, determining the correlation host and writing the message to the incomplete database of the host;
  for pending messages in the incomplete database of the revived charging collection function node, for which the revived charging collection function node is the correlation host, broadcasting a message to the other nodes in the network indicating that the charging collection function node has been revived.

2. The method of claim 1, wherein the message prompts the other charging collection function nodes to send the records they are storing in their own incomplete database for the revived charging collection function node.

3. The method of claim 2, wherein the message is sent at least three times after the charging collection function node is revived to compensate for a charging collection function node missing the message.

4. The method of claim 1, further comprising:
performing a cyclic evaluation by a resident agent on the first charging collection function node to determine if the correlation host is the charging collection function node;
for messages in the incomplete database on the charging collection function node, where the correlation host is not the charging collection function node, writing the ACRs into the incomplete database of the actual in-service correlation host as determined by a distributed correlation approach algorithm;
for messages in the incomplete database on the charging collection function node, where the correlation host is not the charging collection function node, storing the ACRs in the incomplete database if the actual correlation host is out-of-service, until the next evaluation cycle arrives;
for messages in the incomplete database on the charging collection function node, computing the time for which the messages have been in the incomplete database and applying appropriate controls, wherein the oldest messages are ejected upon exceeding a configurable database watermark and such ejection results in an output to a file system marked for unprocessed records;
for messages in the incomplete database on the charging collection function node, computing the time for which the messages have been in the incomplete database and applying appropriate controls, wherein messages that are too old to be of significance are ejected from the incomplete database and such ejection results in an output to a file system marked for unprocessed records;

for remaining messages in the incomplete database in the charging collection function node, if it is determined that the charging collection function node is the correlation host, determining whether ACR[Start] and ACR[Stop] messages have been made available in the incomplete database, and if so, proceeding with aggregation and correlation.

5. The method of claim 1 wherein the charging collection function node comprises a 3GPP Charging Data Function (CDF) and a Charging Gateway Function (CGF).

6. The method of claim 5 wherein the CDF and CGF reside in separate physical elements.

7. The method of claim 5 wherein the CDF and CGF are integrated within the same physical element.

8. A system for processing Accounting Request (ACR) messages in an IP Multimedia Subsystem (IMS) network, the system comprising one or more processor-based devices configured to perform a method comprising:

for an ACR [Interim] or ACR[Stop] message for a session received by a charging collection function node, if a corresponding ACR [Start] message is not there with the charging collection function node, the ACR [Interim] or ACR[Stop] message is stored in an incomplete database associated with the charging collection function node;

if the charging collection function node that hosts the correlation functionality (the "correlation host") for the ACRs is in-service, the charging collection function node processes the ACRs as follows:

if the charging collection function node is sending aggregated charging data records (CDRs), then the CDRs are written into a correlation database of the correlation host;

if the charging collection function node is sending ACRs from the incomplete database, then the ACRs are written into the incomplete database of the correlation host;

reviving an out of service charging collection function node;

processing the revived charging collection function node's corresponding incomplete database as follows:

for ACR messages wherein the revived charging collection function node is not the correlation host, determining the correlation host and writing the message to the incomplete database of the host;

for pending messages in the incomplete database of the revived charging collection function node, for which the revived charging collection function node is the correlation host, broadcasting a message to the other nodes in the network indicating that the charging collection function node has been revived.

9. The system of claim 8, wherein the message prompts the other charging collection function nodes to send the records they are holding in their own incomplete database for the revived charging collection function node.

10. The system of claim 9, wherein the message is sent at least three times after the charging collection function node is revived to compensate for a charging collection function node missing the message.

11. The system of claim 8, wherein the method further comprises:

performing a cyclic evaluation by a resident agent on the first charging collection function node to determine if the correlation host is the charging collection function node;

for messages in the incomplete database on the charging collection function node, where the correlation host is not the charging collection function node, writing the ACRs into the incomplete database of the actual in-service correlation host as determined by a distributed correlation approach algorithm;

for messages in the incomplete database on the charging collection function node, where the correlation host is not the charging collection function node, holding on to the ACRs in the incomplete database if the actual correlation host is out-of-service, until the next evaluation cycle arrives;

for messages in the incomplete database on the charging collection function node, computing the time for which the messages have been in the incomplete database and applying appropriate controls, wherein the oldest messages are ejected upon exceeding a configurable database watermark and such ejection results in an output to a file system marked for unprocessed records;

for messages in the incomplete database on the charging collection function node, computing the time for which the messages have been in the incomplete database and applying appropriate controls, wherein messages that are too old to be of significance are ejected from the incomplete database and such ejection results in an output to a file system marked for unprocessed records;

for remaining messages in the incomplete database in the charging collection function node, if it is determined that the charging collection function node is the correlation host, determining whether ACR[Start] and ACR [Stop] messages have been made available in the incomplete database, and if so, proceeding with aggregation and correlation.

12. The system of claim 8 wherein the charging collection function node comprises a 3GPP Charging Data Function (CDF) and a Charging Gateway Function (CGF).

13. The system of claim 12 wherein the CDF and CGF reside in separate physical elements.

14. The system of claim 12 wherein the CDF and CGF are integrated within the same physical element.

* * * * *